United States Patent [19]
Shibata et al.

[11] Patent Number: 5,478,784
[45] Date of Patent: Dec. 26, 1995

[54] SILICON NITRIDE POWDER AND SILICON NITRIDE-CONTAINING AQUEOUS SLURRY

[75] Inventors: Koji Shibata; Hiroshi Yanagisawa; Tetsuo Yamada, all of Yamaguchi, Japan

[73] Assignee: Ube Industries, Ltd., Ube, Japan

[21] Appl. No.: 350,149

[22] Filed: Nov. 29, 1994

[30] Foreign Application Priority Data

Dec. 10, 1993 [JP] Japan .................................. 5-310362
Feb. 4, 1994 [JP] Japan .................................. 6-012577
Oct. 17, 1994 [JP] Japan .................................. 6-250394

[51] Int. Cl.$^6$ ............................................... C04B 35/584
[52] U.S. Cl. ................................................. 501/97; 423/344
[58] Field of Search .......................... 501/97, 98; 423/344

[56] References Cited

U.S. PATENT DOCUMENTS

| | | | |
|---|---|---|---|
| 5,030,434 | 7/1991 | Pitzer et al. | 501/97 X |
| 5,258,169 | 11/1993 | Wannagat et al. | 501/97 X |
| 5,273,942 | 12/1993 | McCauley et al. | 501/97 |
| 5,348,919 | 9/1994 | Kuwabara et al. | 501/97 |
| 5,378,666 | 1/1995 | Bachelard et al. | 501/97 |
| 5,382,554 | 1/1995 | Kuwabara et al. | 501/97 |

*Primary Examiner*—Karl Group
*Attorney, Agent, or Firm*—Kanesaka & Takeuchi

[57] ABSTRACT

Disclosed is a powder of silicon nitride particles having a specific surface area of from 5 to 20 m$^2$/g. When an aqueous solution of a polyvinyl alcohol having a mean degree of polymerization of X and a degree of saponification of Y (mol %) is adsorbed to the powder, the amount of saturated adsorption at 20° C. is not higher than the amount of adsorption to be represented by:

Amount of Adsorption (mg/m$^2$)= 0.000112$X$+0.523$Y$/100−0.207 (1)

Also disclosed is a low-viscosity silicon nitride-containing aqueous slurry containing said powder.

10 Claims, No Drawings

SILICON NITRIDE POWDER AND SILICON NITRIDE-CONTAINING AQUEOUS SLURRY

FIELD OF THE INVENTION

The present invention relates to a silicon nitride powder, from which a silicon nitride-containing aqueous slurry having a low viscosity and being suitable as a raw material for producing a sintered silicon nitride body may easily be prepared, and also to a silicon nitride-containing aqueous slurry containing such a silicon nitride powder and having a low viscosity.

DESCRIPTION OF THE RELATED ART

Since silicon nitride based ceramics have high strength and excellent heat resistance and impact resistance, it has become noticeable in these days as a high-temperature structure material for parts of gas turbines, parts of car engines, etc.

Such a sintered silicon nitride body is produced, in general, by forming a shaped body having a desired form from a silicon nitride powder followed by sintering it. As methods for producing a shaped body from a silicon nitride powder, there are known cold isostatic-press molding, die-press molding, hot-press molding, injection molding and slip-casting methods etc.

Almost all processes for forming ceramics include a step of preparing a slurry containing a raw material powder.

For example, in cold isostatic-press molding and die-press molding methods, etc., used are spray-dried granules having high fluidity as the raw material to be molded. If granules having low fluidity are used, the shaped body becomes inhomogeneous (as having different densities in different parts constituting it) with the result that it is contracted unevenly, when sintered, to be deformed or cracked.

To prepare granules by spray-drying a slurry, the slurry shall have a fluidity falling within a suitable range. In general, the viscosity of the slurry is adjusted to fall within the range between 50 cPs and 500 cPs, preferably between 100 cPs and 400 cPs. A slurry having a too high viscosity is unfavorable. This is because, when a slurry having such a high viscosity is fed into the atomizer of a drying apparatus, it will clog the duct through which it passes or clog the outlet from which it is atomized. On the contrary, however, if a slurry having a too low viscosity is desired to be formed into granules by spray-drying, coarse particles existing therein will precipitate in the duct so that the composition of the dried granules will become uneven. In addition, the dried granules will be too small and will lose their fluidity.

Therefore, when a slurry to be dried by spraying has a high viscosity, then a solvent is added thereto so as to decrease the powder proportion (to be represented by a ratio of the powder volume to the solvent volume) in the slurry, by which the viscosity of the slurry is varied to fall within the suitable range. On the other hand, when a slurry to be dried by spraying has a low viscosity, then powder is added thereto so as to increase the powder proportion in the slurry, by which the viscosity of the slurry is varied to fall within the suitable range.

However, if a slurry having a low powder proportion is dried by spraying, granules having depressions or doughnut-like granules will be formed with the result that the fluidity of the resulting granules will be poor. In addition, a large quantity of heat will be needed to vaporize the solvent from the slurry so that the production efficiency will be low. Such is unfavorable from the viewpoint of producibility.

Therefore, it is necessary to prepare a slurry having a powder proportion as high as possible and to dry it by spraying to produce spherical granules having good fluidity.

A slurry to be molded by slip-casting also shall have a suitable viscosity. In general, it is adjusted to have a viscosity falling within the range between 50 cPs and 500 cPs, preferably 100 cPs and 400 cPs. If the viscosity of the slurry is too high, the slurry having such a high viscosity will be hardly introduced into the fine parts of the casting mold and the removal of the waste slurry from the mold will be difficult and, in addition, the shaped body will often be cracked when dried. On the contrary, if a slurry having a too low viscosity is molded by slip-casting, coarse particles existing in the slurry will precipitate during the thickening step so that the shaped body will have an uneven composition. In addition, the slurry having such a low viscosity will often leak out from the joint of split dies.

For these reasons, therefore, if the slurry to be molded by slip-casting has a high viscosity, a solvent shall be added thereto so as to decrease the powder proportion, thereby making the slurry have a viscosity falling within a suitable range. If, however, the slurry has a low viscosity, powder shall be added thereto so as to increase the powder proportion, thereby making the slurry have a viscosity falling within a suitable range.

On the other hand, if a slurry having a low powder proportion is used for slip-casting, the thickening speed will be low so that the casting time will be prolonged. Such is unfavorable in view of the producibility. In addition, the shaped body will be largely shrunk and will often be cracked when dried and sintered.

Therefore, it is necessary to prepare a slurry having a powder proportion as high as possible.

As mentioned above, it is recommended to prepare a slurry having a low viscosity while having a limited lowermost solvent content by increasing the ratio of the raw material powder to the solvent therein, since the slurry satisfying the condition may easily be molded into a shaped body with high quality. However, since a molding binder, such as polyvinyl alcohols, polyethylene glycols, acrylate copolymer resins, etc., is generally added to a molding slurry of a silicon nitride material so as to maintain the shape of the shaped body from the slurry, the viscosity of the slurry is increased due to the addition of the binder thereto so that it is often difficult to make the slurry have a viscosity falling within a suitable range. For this reason, heretofore, the amount of the binder to be added to the slurry must be increased so as to improve the dimensional accuracy of the shaped body from the slurry. However, when a slurry is prepared from a silicon nitride powder of fine particles having a specific surface area of from 5 to 20 $m^2/g$, then the viscosity of the slurry is increased by the addition of the binder, causing some problems in molding the slurry into a shaped body.

OBJECT AND SUMMARY OF THE INVENTION

The object of the present invention is to solve the above-mentioned problems and to provide a silicon nitride powder, from which a silicon nitride-containing aqueous slurry having a low viscosity and a high powder content can easily be obtained even though a molding binder is added thereto, and also a low-viscosity, silicon nitride-containing aqueous slurry containing such a silicon nitride powder.

Specifically, the present invention provides a powder of silicon nitride particles having a specific surface area of from 5 to 20 m²/g, which is characterized in that, when an aqueous solution of polyvinyl alcohol having a mean degree of polymerization of X and a degree of saponification of Y (mol %) is adsorbed to the powder, the amount of the saturated adsorption at 20° C. is not higher than the amount of adsorption to be represented by the following numerical formula (1):

Amount of Adsorption (mg/m²)= $0.000112X + 0.523Y/100 - 0.207$ (1)

In addition, it also provides a silicon nitride-containing aqueous slurry to be formed by dispersing the above-mentioned silicon nitride powder and a molding binder in water.

Since the silicon nitride powder of the present invention has a small amount of adsorption of polyvinyl alcohol thereto, it is possible to prepare a low-viscosity silicon nitride molding slurry from this.

DESCRIPTION OF THE PREFERRED EMBODIMENTS

We, the present inventors have variously investigated the reasons why the viscosity of a slurry comprising a powder of silicon nitride particles having a specific surface area of from 5 to 20 m²/g and a molding binder is increased due to the addition of the binder thereto in preparing the slurry and, as a result, have found that the viscosity of the raw material slurry is under the control of the amount of adsorption of polyvinyl alcohol, as the binder, to the silicon nitride powder. Precisely, when polyvinyl alcohol is added to the slurry, the former adsorbs onto the surfaces of the particles in the latter to lower the surface potential of the particles or the surfaces of the particles are coated with hydrophobic groups by which the affinity between the the resulting particles and the solvent is worsened, with the result that the viscosity of the slurry is increased.

The mechanism of the adsorption of polyvinyl alcohol onto the surfaces of silicon nitride particles will be considered as follows:

In general, the solubility of polyvinyl alcohol in water is under the control of the mean degree of polymerization and the degree of saponification of the polymer. Polyvinyl alcohol has a number of hydrophilic hydroxyl groups. These hydroxyl groups form strong intramolecular or intermolecular hydrogen bonds in polyvinyl alcohol, noticeably retarding the solubility of the polymer in water. Polyvinyl alcohol having a low degree of saponification has some hydrophobic acetato groups in place of a part of hydroxyl groups, If the polymer has a suitable amount of acetato groups therein, the intramolecular or intermolecular hydrogen bonds of the hydroxyl groups therein may be weakened with the result that the solubility of polyvinyl alcohol in water is increased. Polyvinyl alcohol has such a basic property, and there are known various polyvinyl alcohols each having a different mean degree of polymerization and a different degree of saponification.

On the other hand, the surfaces of silicon nitride particles have surface functional groups such as silanol (Si—OH) group and silazane (Si₂—NH) group. The content of these functional groups is varied, depending on the conditions for preparing the powder of silicon nitride particles. These functional groups participate in the transfer of protons in water to be the Brø nsted acid points (H⁺ donating points) and base points (H⁺ receiving points). It is considered that polyvinyl alcohol will adsorb onto the surfaces of silicon nitride particles at their Brø nsted acid points via their intramolecular hydroxyl groups.

Therefore, it is considered that the amount of adsorption of polyvinyl alcohol onto the surfaces of silicon nitride particles will be under the control of the mean degree of polymerization and the degree of saponification of the polymer and also the degree of acidity of the silicon nitride particles. We, the present inventors have variously investigated various polyvinyl alcohols each having a different mean degree of polymerization and a different degree of saponification with respect to the relation between the amounts of their adsorption to silicon nitride particles and the viscosities of aqueous slurries comprising them and, as a result, have found that a powder of silicon nitride particles onto which polyvinyl alcohol adsorbs at an amount of saturated adsorption, measured at 20° C., not larger than the amount of adsorption to be represented by the above-mentioned numerical formula can give a low-viscosity slurry of silicon nitride powder.

The amount of saturated adsorption, measured at 20° C., of polyvinyl alcohol onto silicon nitride particles is obtained by the method mentioned below.

33.3% by weight of a silicon nitride powder and 66.7% by weight of ion-exchanged water are mixed at 20° C., and from 0 to 5% by weight, relative to the silicon nitride powder, of polyvinyl alcohol is added thereto, and thereafter these are mixed and milled in a ball mill for a pre-determined period of time to produce a slurry. This slurry is kept at 20° C. and subjected to centrifugation to separate the solid phase and the aqueous phase, and the concentration of polyvinyl alcohol in the aqueous phase is measured, from which the amount of polyvinyl alcohol adsorbed to silicon nitride particles is obtained.

The behavior of polyvinyl alcohol to adsorb onto the surfaces of silicon nitride particles gives a Langmuir's adsorption isotherm. The amount of adsorption of polyvinyl alcohol to the same silicon nitride particles is obtained at several equilibrium concentrations, and the amount of the saturated adsorption of the polymer to the particles is calculated from the Langmuir's adsorption isotherm.

Polyvinyl alcohol to be used herein generally has a mean degree of polymerization (X) of from 300 to 2400 and a degree of saponification (Y mol %) of from 85 to 99.

The silicon nitride particles to be used in the present invention have a specific surface area of from 5 to 20 m²/g, onto which polyvinyl alcohol having a mean degree of polymerization (X) and a degree of saponification (Y) adsorbs at 20° C. at the amount of saturated adsorption not higher than the amount of saturation to be represented by the above-mentioned numerical formula (1).

To measure the specific surface area of silicon nitride particles to,be used in the present invention, for example, a single-point BET method (N₂ gas adsorption) using Flowsorb 2300 Type made by Shimadzu-Micromeritics can be employed.

A powder of silicon nitride particles having a specific surface area falling within the range defined above can be produced in the manner mentioned below, for example, from a silicon nitride powder to be prepared by the following (A) imide decomposition method or (B) direct nitridation method.

(A) Imide Decomposition Method:

Reaction products of silicon tetrahalide, and ammonia are pyrolyzed at 1000° C.~1600° C. for about 30 minutes to obtain an amorphous powder having a mean particle size of about 5 nm and a crystalline powder having a mean particle size of about 0.2 μm land having a specific surface area of 10 m²/g).

(B) Direct Nitridation Method:

Silicon particles having a specific surface area of 10 m²/g or more and from 5 to 10% by weight of $Si_3N_4$, as raw materials, were reacted in a mixed gas atmosphere of $N_2/H_2$ at about 1550° C. for about 4 hours, while the heating rate was about 5° C./min. The resulting powder was milled in an attritor for 2 hours to obtain a powder having a mean particle size of about 0.2 μm (and having a specific surface area of 10 m²/g).

According to the imide decomposition method to produce a silicon nitride powder, the surface state of the powder is controlled by milling process wherein the silanol (Si—OH) concentration on the surfaces of the particles is changed. The milling condition is essentially under the control of the milling time (in general, from 5 to 60 minutes) and the $H_2O$ partial pressure (in general, from 0.5 to 5 mg/liter) in the milling atmosphere. The longer the milling time and the higher the $H_2O$ partial pressure, the higher the silanol concentration on the surfaces of the particles. The powder having a higher silanol concentration has more Brϕnsted acid points ($H^+$ donating points:), onto which, therefore, a larger amount of polyvinyl alcohol adsorbs. Therefore, the milling condition shall be controlled in such a way that the amount of saturated adsorption of polyvinyl alcohol at 20° C. to the powder may be not higher than the amount of adsorption represented by the above-mentioned numerical formula (1).

The degree of acidity of the surfaces of silicon nitride particles to be produced by the direct nitridation method can be controlled by controlling the milling condition in the powdering process and the condition for the subsequent step of treating the resulting powder with hydrofluoric acid. In general, the HF concentration in the step is from 0.02 to 0.2 g-HF/g-$Si_3N_4$. The condition for the step of treating the powder with hydrofluoric acid is essentially under the control of the hydrofluoric acid concentration. The powder treated with a thick hydrofluoric acid is to have a lower degree of acidity, onto which, therefore, a smaller amount of polyvinyl alcohol will adsorb. Therefore, the condition for the treatment of the powder with hydrofluoric acid shall be controlled in such a way that the amount of saturated adsorption of polyvinyl alcohol at 20° C. to the powder may be not higher than the amount of adsorption represented by the above-mentioned numerical formula (1).

The treatment with hydrofluoric acid is conducted generally in the presence of a mineral acid such as hydrochloric acid, sulfuric acid, nitric acid, etc. The concentration of the mineral acid may be, in general, from 1.0 to 3.0 g/g-$Si_3N_4$. When hydrochloric acid or sulfuric acid is employed in the treatment, a smaller amount of hydrofluoric acid may exhibit the intended effect. When nitric acid is employed in the same, the concentration of hydrofluoric acid to be used must be increased. However, in order to more accurately control the degree of acidity of the surfaces of the particles, it is recommended to treat the powder with a mixed system comprising hydrofluoric acid and nitric acid even though the amount of hydrofluoric acid to be used for the treatment will increase a little.

It is desirable that the silicon nitride powder of the present invention, which is produced in the manner as mentioned above, has a specific surface area of from 6 to 15 m²/g and an oxygen content of from 1.0 to 1.5% by weight and that the amount of saturated absorption of polyvinyl alcohol thereto at 20° C. is from 0.10 to 0.32 mg/m².

The oxygen content as referred to herein is measured, for example, by an inert gas combustion method using TC-136 made by LECO Co.

According to the present invention, the silicon nitride powder, onto which the above-mentioned polyvinyl alcohol adsorbs, at 20° C., at an amount of saturated adsorption not higher than the amount of adsorption represented by the above-mentioned numerical formula (1), is dispersed in water along with a molding binder to obtain a low-viscosity, silicon nitride-containing aqueous slurry.

The silicon nitride-containing aqueous slurry of the present invention can be prepared, for example, to have the composition mentioned below, and its viscosity is generally from 100 to 500 cPs or so.

Silicon Nitride Powder: 82 to 96.5 wt. %

Yttria Powder: 3.0 to 10.0 wt. %

Alumina Powder: 0.5 to 8.0 wt. %

Water: balance

Binder: 1 to 5 wt. %, relative to the sum of the powder mixture

Dispersing Agent: 0.1 to 0.5 wt. %, relative to the sum of the powder mixture

As the binder, for example, usable are polyvinyl alcohol, poly acrylic acid, poly alkyl methacrylate acrylate copolymer resins, methylcellulose etc. As the dispersing agent, for example, usable are diethylamine, poly acrylic acid ammonium salt, poly carboxylic acid ammonium salt etc.

The present invention will be explained in more detail by means of the following examples and comparative examples, which, however, are not intended to restrict the scope of the present invention.

EXAMPLES 1 TO 4, COMPARATIVE EXAMPLE 1

An amorphous silicon nitride powder obtained by the imide decomposition method was calcined for 2 hours under the condition shown in Table 1 below to prepare a crystalline silicon nitride powder consisting essentially of a -phase. This was milled in an air stream having a pre-determined dew point under the vibration-milling condition shown in the same table to obtain a silicon nitride powder having the powder characteristics also shown in the same table.

Using the silicon nitride powder as a raw material, a silicon nitride-containing aqueous slurry was prepared under the condition mentioned below.

Precisely, 33.3% by weight of the silicon nitride powder and 66.7% by weight of ion-exchanged water were mixed at 20° C., to which added was a pre-determined amount of polyvinyl alcohol (having a mean degree of polymerization of 550 and a degree of saponification of 88.0 mol %). These were mixed and milled in a ball mill for 24 hours. The resulting slurry was kept at 20° C. and subjected to centrifugation to separate it into the solid phase and the aqueous phase. The concentration of polyvinyl alcohol in the aqueous phase was measured, from which the amount of polyvinyl alcohol adsorbed to silicon nitride particles was calculated. The results obtained are shown in Table 2 below. The amount of saturated adsorption of polyvinyl alcohol at 20°

C. was from 0.10 to 0.42 mg/m². Next, using the silicon nitride powder, onto which the amount of saturated adsorption of polyvinyl alcohol adsorbed had been measured, a silicon nitride molding slurry was produced under the condition mentioned below.

93% by weight of the silicon nitride powder, 5% by weight of yttria powder and 2% by weight of alumina powder were mixed, to which added was ion-exchanged water to make the powder concentration therein 50% by weight. In addition, 0.3% by weight, relative to the total amount of the powder mixture, of diethylamine, as a dispersing agent, and 3% by weight, relative to the same, of polyvinyl alcohol, as a binder, were added thereto. These were mixed and milled in a ball mill for 24 hours. The viscosity of the resulting slurry was measured, using an E-type viscometer, at 20° C. and under the condition of 0.5 rpm. The results obtained are shown in Table 2. The viscosity of the slurry was from 280 to 1150 cPs. Slurries having a viscosity of 500 cPs or less can be molded. Substituting polyvinyl alcohol having a mean degree of polymerization of 550 and a degree of saponification of 88.0 mol % for that having X and Y, respectively, in formula (1), the amount of saturated adsorption of the polymer is 0.32 mg/m². Using a silicon nitride powder, onto which polyvinyl alcohol adsorbed has an amount of saturated adsorption of not larger than 0.32 mg/m², a low-viscosity slurry can be produced.

and a degree of saponification of 98.5 mol % (Table 5) for That having X and Y, respectively, in formula (1), the amount of saturated adsorption of the polymer was 0.37 mg/m², 0.45 mg/m² and 0.50 mg/m², respectively. Using a silicon nitride powder, onto which polyvinyl alcohol adsorbed has an amount of adsorption not larger than the value to be represented by formula (1), a low-viscosity slurry can be produced.

TABLE 3

|  | Amount of Saturated Adsorption (mg/m²) | Viscosity of Slurry (cPs) |
| --- | --- | --- |
| Example 5 | 0.15 | 210 |
| Example 6 | 0.23 | 280 |
| Example 7 | 0.31 | 330 |
| Example 8 | 0.34 | 340 |
| Comparative Example 2 | 0.44 | 1050 |

TABLE 4

|  | Amount of Saturated Adsorption (mg/m²) | Viscosity of Slurry (cPs) |
| --- | --- | --- |
| Example 9 | 0.24 | 230 |
| Example 10 | 0.27 | 270 |
| Example 11 | 0.32 | 310 |
| Example 12 | 0.42 | 410 |
| Comparative Example 3 | 0.55 | >1200 |

TABLE 1

|  | Temperature for Calcination (°C.) | Conditions for Vibration-milling | | | Characteristics of Powder | |
| --- | --- | --- | --- | --- | --- | --- |
|  |  | H₂O Partial Pressure (mg/liter) | Amplitude (mm) | Treating Time (min) | Specific Surface Are(m²/g) | Oxygen Content (wt. %) |
| Example 1 | 1550 | 0.5 | 6 | 15 | 10.4 | 1.1 |
| Example 2 | 1550 | 1.0 | 6 | 30 | 11.2 | 1.2 |
| Example 3 | 1550 | 3.0 | 6 | 30 | 10.8 | 1.4 |
| Example 4 | 1550 | 1.0 | 9 | 15 | 11.6 | 1.3 |
| Comparative Example 1 | 1510 | 10 | 9 | 30 | 11.7 | 1.6 |

TABLE 2

|  | Amount of Saturated Adsorption (mg/m²) | Viscosity of Slurry (cPs) |
| --- | --- | --- |
| Example 1 | 0.10 | 280 |
| Example 2 | 0.11 | 300 |
| Example 3 | 0.24 | 360 |
| Example 4 | 0.30 | 420 |
| Comparative Example 1 | 0.42 | 1150 |

EXAMPLES 5 TO 16, COMPARATIVE EXAMPLES 2 TO 4

The same process as in Example 1 was repeated, using polyvinyl alcohols each having a different mean degree of polymerization and a different degree of saponification. The results obtained are shown in Tables 3, 4 and 5. Substituting each of polyvinyl alcohol having a mean degree of polymerization of 550 and a degree of saponification of 98.5 mol % (Table 3), that having a mean degree of polymerization of 1750 and a degree of saponification of 88.0 mol % (Table 4) and that having a mean degree of polymerization of 1750

TABLE 5

|  | Amount of Saturated Adsorption (mg/m²) | Viscosity of Slurry (cPs) |
| --- | --- | --- |
| Example 13 | 0.10 | 120 |
| Example 14 | 0.18 | 160 |
| Example 15 | 0.24 | 210 |
| Example 16 | 0.43 | 280 |
| Comparative Example 4 | 0.55 | 900 |

EXAMPLES 17 TO 20, COMPARATIVE EXAMPLE 5

Metallic silicon powder having a specific surface area of 10 m²/g or more was calcined in a mixed atmosphere of nitrogen/hydrogen under the conditions shown in Table 6 below and the heat-treated to obtain an ingot of silicon nitride. The resulting ingot was roughly ground by an ordinary two-stage grinding method and then dry-milled in an attritor, while controlling the particle size of the resulting particles. The impurities mixed into the particles during the grinding and milling process were removed by dissolving them in a mixed solution comprising hydrofluoric acid, sulfuric acid and nitric acid, and then the particles were dried to obtain a silicon nitride powder.

Using the thus-obtained silicon nitride powder as a raw material, a silicon nitride-containing aqueous slurry was prepared in the same manner as in Example 1, and the amount of saturated adsorption of polyvinyl alcohol adsorbed to the silicon nitride particles was measured.

Next, using the silicon nitride powder, onto which the amount of saturated adsorption of polyvinyl alcohol adsorbed had been measured, a silicon nitride molding slurry was produced under the condition mentioned below.

90% by weight of the silicon nitride powder, 5% by weight of yttria powder and 5% by weight of alumina powder were mixed, to which added was ion-exchanged water to make the powder concentration therein 50% by weight. In addition, 0.3% by weight, relative to the total amount of the powder mixture, of diethylamine, as a dispersing agent, and 3% by weight, relative to the same, of polyvinyl alcohol, as a binder, were added thereto. These were mixed and milled in a ball mill for 24 hours. The viscosity of the resulting slurry was measured, using an E-type viscometer, at 20° C. and under the condition of 0.5 rpm. The results obtained are shown in Table 7. From formula (1), polyvinyl alcohol having a mean degree of polymerization of 550 and a degree of saponification of 88.0 mol % had an amount of saturated adsorption of 0.32 mg/m². Like the silicon nitride powder obtained by the imide decomposition method, the silicon nitride powder obtained by the direct nitridation method can also be formed into a low-viscosity slurry, provided that the amount of saturated adsorption of polyvinyl alcohol adsorbed to the powder is not larger than 0.32 mg/m².

TABLE 6

| | Conditions for Nitridation at 1150 to 1450° C. | | Condition for Heat Treatment of Nitrogenated Ingot (°C. -h) | Milling Time in Attritor (hr) | Conditions for Treatment with Mixed Acid | | | | | Characteristics of Powder | |
|---|---|---|---|---|---|---|---|---|---|---|---|
| | Oxygen Concentration in Nitrogenation Furnace (vol. %) | Heating rate (°C./hr) | | | Concentration of Hydrofluoric Acid (wt. %) | Concentration of Sulfuric Acid (wt. %) | Concentration of Nitric Acid (wt. %) | Temperature for Treatment (°C.) | Treating Time (hr) | Specific Surface Area (m²/g) | Oxygen Content (wt. %) |
| Example 17 | 0.2 | 6 | 1550-4 | 2.0 | 2.0 | 10 | 5 | 60 | 15 | 9.0 | 1.2 |
| Example 18 | 0.2 | 6 | 1550-4 | 1.0 | 1.7 | 14 | 5 | 60 | 15 | 6.2 | 1.4 |
| Example 19 | 0.4 | 10 | 1700-2 | 3.0 | 1.6 | 18 | 5 | 60 | 24 | 13.0 | 1.6 |
| Example 20 | 0.1 | 14 | 1750-5 | 1.0 | 1.2 | 22 | 5 | 60 | 24 | 6.8 | 1.3 |
| Comparative 5 | 0.1 | 8 | 1550-4 | 1.5 | 0.4 | 22 | 10 | 60 | 24 | 12.3 | 1.6 |

*100 g of the silicon nitride powder was dispersed in 1 kg of an aqueous solution of the mixed acid and purified.

TABLE 7

| | Amount of Saturated Adsorption (mg/m²) | Viscosity of Slurry (cPs) |
|---|---|---|
| Example 17 | 0.17 | 210 |
| Example 18 | 0.22 | 320 |
| Example 19 | 0.26 | 380 |
| Example 20 | 0.30 | 450 |
| Comparative Example 5 | 0.44 | 1030 |

EXAMPLE 21

The silicon nitride molding slurries prepared in Examples 1 to 4 each were molded by slip-casting, according to the process mentioned below.

First, the slurry was defoamed in vacuum and slip-cast into a gypsum mold, in which the slurry was molded. After the thickness of the slip-cast body reached a pre-determined value, the excess slurry was discharged. After the discharging, this was allowed to stand as it was for 16 hours. After the body became hardened, it was released from the mold and then dried further.

The shaped body thus obtained had no cracks and was good.

COMPARATIVE EXAMPLE Example 6

The silicon nitride molding slurry prepared in Comparative Example 1 was molded by slip-casting, in the same manner as in Example 21.

The shaped body thus obtained was cracked, after dried.

EXAMPLE 22

The silicon nitride molding slurries prepared in Examples 1 to 4 each were fed into a spray-drying apparatus, using a liquid-feeding pump, and spray-dried therein with hot air at 150° C., using an atomizer rotating at a rotation speed of 8000 rpm, to prepare particles.

The particles thus obtained were spherical, having a mean particle size of from 45 to 75 μm, as shown in Table 8 below, and having high fluidity.

COMPARATIVE EXAMPLE 7

The silicon nitride molding slurry prepared in Comparative Example 1 was tried to be spray-dried in the same manner as in Example 22, but it clogged the outlet of the liquid-feeding tube so that the spray-drying of the slurry was impossible.

TABLE 8

|  | Viscosity of Slurry (cPs) | Mean Particle Size of Spraydried Particles (μm) |
|---|---|---|
| Example 1 | 280 | 45 |
| Example 2 | 300 | 52 |
| Example 3 | 360 | 63 |
| Example 4 | 420 | 75 |
| Comparative Example 1 | 1150 | Spray-drying was impossible. |

While the invention has been described in detail and with reference to specific embodiments thereof, it will be apparent to one skilled in the art that various changes and modifications can be made therein without departing from the spirit and scope thereof.

What is claimed is:

1. A powder of silicon nitride particles having a specific surface area of from 5 to 20 m$^2$/g, and an amount of saturated adsorption for polyvinyl alcohol at 20° C. by a polyvinyl alcohol adsorption test, which is more than 0.10 mg/m$^2$ and less than an amount of adsorption represented by following formula (1):

$$\text{amount of adsorption (mg/m}^2\text{)} = 0.000112X + 0.523Y/100 - 0.207 \quad (1)$$

wherein X is a mean degree of polymerization of polyvinyl alcohol and Y is a degree of saponification (mol %) of polyvinyl alcohol.

2. The powder of silicon nitride particles as claimed in claim 1, in which the particles have a specific surface area of from 6 to 15 m$^2$/g and an oxygen content of from 1.0 to 1.5% by weight.

3. The powder of silicon nitride particles as claimed in claim 1, in which the amount of saturated adsorption of polyvinyl alcohol adsorbed onto the particles at 20° C. is from 0.10 to 0.32 mg/m$^2$.

4. A silicon nitride-containing aqueous slurry comprising, a powder of silicon nitride particles having a specific surface area of from 5 to 20 m$^2$/g, and an amount of saturated adsorption for polyvinyl alcohol at 20° C. by a polyvinyl alcohol adsorption test, which is more than 0.10 mg/m$^2$ and less than an amount of adsorption represented by following formula (1):

$$\text{amount of adsorption (mg/m}^2\text{)} = 0.000112X + 0.523Y/100 - 0.207 \quad (1)$$

wherein X is a mean degree of polymerization of polyvinyl alcohol and Y is a degree of saponification (mol %) of polyvinyl alcohol, and a molding binder dispersed in water together with said powder.

5. The silicon nitride-containing aqueous slurry as claimed in claim 4, which comprises from 82 to 96.5% by weight of the silicon nitride powder, from 3.0 to 10.0% by weight of yttria powder and from 0.5 to 8.0% by weight of alumina powder.

6. The silicon nitride-containing aqueous slurry as claimed in claim 4, which contains the binder in an amount of from 1.0 to 5.0% by weight, relative to the weight of the powder.

7. The silicon nitride-containing aqueous slurry as claimed in claim 4, which has a viscosity of from 100 to 500 cPs.

8. A silicon nitride-containing aqueous slurry comprising, a powder of silicon nitride particles having a specific surface area of from 5 to 20 m$^2$/g, and polyvinyl alcohol dispersed in water together with said powder, wherein an amount of saturated adsorption of the powder for polyvinyl alcohol at 20° C. is more than 0.10 mg/m$^2$ and less than an amount of adsorption represented by following formula (1):

$$\text{amount of adsorption (mg/m}^2\text{)} = 0.000112X + 0.523Y/100 - 0.207 \quad (1)$$

wherein X is a mean degree of polymerization of polyvinyl alcohol and Y is a degree of saponification (mol %) of polyvinyl alcohol.

9. The silicon nitride containing aqueous slurry as claimed in claim 8, in which the polyvinyl alcohol has a mean degree of polymerization of from 300 to 2400 and a degree of saponification of from 85 to 99 mol %.

10. A powder of silicon nitride particles prepared by pyrolyzing a reaction product of silicon halide and ammonia to form an amorphous silicon nitride powder and calcining the amorphous silicon nitride powder, said powder having a specific surface area of from 5 to 20 m$^2$/g, and an amount of saturated adsorption for polyvinyl alcohol at 20° C. by a polyvinyl alcohol adsorption test, which is more than 0.10 mg/m$^2$ and less than an amount of adsorption represented by following formula (1):

$$\text{amount of adsorption (mg/m}^2\text{)} = 0.000112X + 0.523Y/100 - 0.207 \quad (1)$$

wherein X is a mean degree of polymerization of polyvinyl alcohol and Y is a degree of saponification (mol %) of polyvinyl alcohol.

* * * * *